US011022167B2

(12) United States Patent
Berrell (10) Patent No.: US 11,022,167 B2
(45) Date of Patent: Jun. 1, 2021

(54) SECURITY DEVICE (71) Applicant: Ian Patrick Berrell, Berlin (DE)

(72) Inventor: Ian Patrick Berrell, Berlin (DE)

(73) Assignee: HEXLOX UG

( * ) Notice: Subject to any disclaimer, the term of this patent is extended or adjusted under 35 U.S.C. 154(b) by 350 days.

(21) Appl. No.: 15/755,109

(22) PCT Filed: Aug. 26, 2016

(86) PCT No.: PCT/IB2016/055109
§ 371 (c)(1),
(2) Date: Feb. 26, 2018

(87) PCT Pub. No.: WO2017/033158
PCT Pub. Date: Mar. 2, 2017

(65) Prior Publication Data
US 2019/0154074 A1    May 23, 2019

(30) Foreign Application Priority Data
Aug. 26, 2015 (AU) ................................. 2015903463

(51) Int. Cl.
*F16B 41/00* (2006.01)
*F16B 1/00* (2006.01)

(52) U.S. Cl.
CPC ............ *F16B 41/005* (2013.01); *F16B 41/00* (2013.01); *F16B 2001/0035* (2013.01)

(58) Field of Classification Search
CPC ........ F16B 23/00; F16B 23/003; F16B 37/14; F16B 41/005; F16B 2001/0035; F16B 41/00; Y10S 411/91; Y10S 411/919
(Continued)

(56) References Cited

U.S. PATENT DOCUMENTS 3,273,442 A * 9/1966 Launay ................. B25B 15/007
411/403
3,302,672 A * 2/1967 Walton .................. B25B 15/004
81/461
(Continued)

FOREIGN PATENT DOCUMENTS

DE       19902192      7/2000
EP        1491777     12/2004
(Continued)

OTHER PUBLICATIONS

Hexlox Demo—Hexlox.com—facebook.com/thehexlox [Viewed on internet on Oct. 10, 2016], <URL:https://www.youtube.com/watch'?v=K-E57JYWbC8>, Published on Jan. 14, 2016.
(Continued)

*Primary Examiner* — Roberta S Delisle
(74) *Attorney, Agent, or Firm* — Galbreath Law Offices, P.C.; John A. Galbreath (57) ABSTRACT

A security plug (10) adapted to be inserted into the female socket (18) of a fastener (20) to prevent a tool, such as an Allen key, engaging in the female socket. The plug (10) has an outer surface (22) complementary to the female socket (18) and a retaining member (14) that retains the plug (10) in the female socket (18), and at least one removal portion (26, 70) adapted to be engaged by a second tool (100), whereby engagement of the second tool (100) and the plug (10) allows forces applied by the second tool (100) to the plug (10) to withdraw the plug from the female socket against the action of the retaining member. The second tool and the removal portion (26, 70) may have complementary Morse tapers and the retaining member (14) may be a magnet.

29 Claims, 11 Drawing Sheets

(58) Field of Classification Search
USPC .................. 411/402, 403, 429, 430, 431
See application file for complete search history.

(56) References Cited

U.S. PATENT DOCUMENTS

| | | | | |
|---|---|---|---|---|
| 3,405,595 A * | 10/1968 | Peterson | ................ | F16B 37/14 |
| | | | | 411/405 |
| 4,242,932 A * | 1/1981 | Barmore | ............ | F16B 23/0092 |
| | | | | 411/403 |
| 4,870,842 A * | 10/1989 | Plumer | ................ | E05B 35/008 |
| | | | | 70/232 |
| 5,027,628 A * | 7/1991 | De Rocher | ............ | B62H 5/001 |
| | | | | 70/225 |
| 5,097,686 A * | 3/1992 | Plumer | ................ | E05B 35/008 |
| | | | | 70/232 |
| 6,641,343 B1 | 11/2003 | Duran | | |
| 7,162,939 B2 * | 1/2007 | Totsu | ................... | B25B 13/485 |
| | | | | 411/403 |
| 7,775,754 B2 * | 8/2010 | Calandra | ................ | F16B 37/14 |
| | | | | 411/5 |
| 8,540,756 B2 * | 9/2013 | Olsen | ................... | A61B 17/862 |
| | | | | 606/305 |
| 2002/0029596 A1 | 3/2002 | Tallarico | | |
| 2004/0228703 A1* | 11/2004 | Such | ..................... | B25B 13/485 |
| | | | | 411/403 |
| 2012/0165107 A1* | 6/2012 | Guo | ..................... | F16B 23/003 |
| | | | | 470/57 |

FOREIGN PATENT DOCUMENTS

| | | |
|---|---|---|
| GB | 2189303 | 10/1987 |
| JP | H0814148 A | 1/1996 |

OTHER PUBLICATIONS

Hexlox—Incredibly Smart Bike Security [Viewed on internet on 10 Oct. 2016] <URL:http://www.bicycles.net.au/20 I 6/03/hexIox-incredibly-smart-bike-security/>, Published on Mar. 17, 2016.

* cited by examiner

SECURITY DEVICE

FIELD OF INVENTION

This invention relates to security plugs and more particularly to devices that attaches to the head of a bolt to prevent the bolt being loosened. More particularly it relates to devices that engage within a female recess on a bolt. However, the invention is not limited to use with only bolts and/or female recesses.

BACKGROUND

Security deterrents exist for nuts and bolts but require either a special new bolt or require removal of the bolt and a security cap to be mounted on the bolt and the bolt reinserted. The present invention aims to provide a security plug that can be attached to a bolt or nut in situ without the need for removal of the nut or bolt.

SUMMARY OF THE INVENTION

In one broad form the invention provides a security plug for a fastener having a female socket adapted to receive a first tool, the plug adapted to be inserted into the female socket to prevent the first tool engaging in the female socket, the plug comprising:
  an outer surface complementary to the female socket;
  at least one retaining member for retaining the plug in the female socket, and
  at least one first surface adapted to be engaged by a second tool having at least one second surface complementary to the at least one first surface, whereby engagement of the at least one first and second surfaces provides engagement between the second tool and the plug to allow forces applied by the second tool to the plug to withdraw the plug from the female socket against the action of the at least one retaining member.

In another broad form the invention provides a security plug for a fastener having a female socket adapted to receive a first tool, the plug adapted to be inserted into the female socket to prevent the first tool engaging in the female socket, the plug comprising:
  an outer surface complementary to the female socket;
  at least one retaining member for retaining the plug in the female socket, and
  at least one removal portion adapted to be engaged by a second tool, whereby engagement of the second tool and the plug allows forces applied by the second tool to the plug to withdraw the plug from the female socket against the action of the retaining member.

The forces applied may be one or more of an axial force, a rotary force and a radial force.

The engagement of the first and second surfaces may be a mechanical engagement or may be a magnetic engagement.

The engagement of the at least one removal portion with the second tool may be a mechanical engagement or may be a magnetic engagement.

In preferred forms of the invention the engagement occurs by abutting the two components together so as to engage mechanically or magnetically.

The retaining member is preferably a magnet but may comprise a mechanical connection with the socket. For example, the retaining member may comprise at least one protrusion that engages the socket, preferably side wall(s) or the socket. The at least one protrusion may define at least part of at least one screw thread, whereby rotation of the plug by the second tool causes withdrawal of the plug.

The retaining member may comprise an expandable/contactable retaining member or assembly, whereby expansion/contraction moves at least one contact surface of the retaining member into engagement with the socket or out of engagement with the socket The retaining member may comprise a first part and a second part whereby rotation of the first part relative to the second part causes an increase in a dimension of the assembly.

The first surface is preferably a conical or frusto-conical. The first surface more preferably has a Morse taper or a Morse like taper.

The first surface may an inner surface or an outer surface.

The plug may include a tubular portion and the first surface may an inner surface of the tubular portion.

The first surface may have a free end and an inner end. The free end may have a diameter larger than the diameter of the inner end.

The plug may include one or more stop surfaces to limit the location of the second tool relative to the plug.

Where the first surface is defined at least in part by at least part of an inner surface of the tubular portion the plug may include at least one protrusion. The protrusion may extend axially along the tubular portion.

In a preferred embodiment the major portion of the protrusion comprises at least one of a conical and frusto-conical surface. Preferably the major portion comprises a frusto-conical surface and a conical surface extending from the frusto-conical surface but may comprise a conical surface. Where the major portion includes a conical surface, preferably the point of the conical surface is located at, adjacent to or close to the open end.

The protrusion may be formed integrally with the first surface or may be formed as a separate component.

In one embodiment the plug comprises a shell defining the first surface, a recess having an opening and an inner end spaced from the opening, a spacer and a magnet located in the recess with the spacer sandwiched between the inner end and the magnet.

The plug may have a tubular portion with at least part of the inner surface defining the first surface The tubular portion preferably has an opening in an inner end. The spacer may include a protrusion that extends through the opening into the tubular portion.

The at least one retaining member may be at least one removal member.

In one embodiment the at least one retaining member includes at least two bar magnets with at least two of the at least two bar magnets arranged with opposite Poles adjacent to each other The at least two bar magnets may extend within the plug to expose, physically or magnetically, the other Poles to action by a removal tool.

The invention also provides the combination of a plug as set out above and a second tool having a second surface complementary to the first surface of the plug.

DETAILED DESCRIPTION OF PREFERRED AND OTHER EMBODIMENTS

Referring to FIGS. 1 to 6 there is shown a security plug 10 according to an embodiment of the invention.

Figure 1:
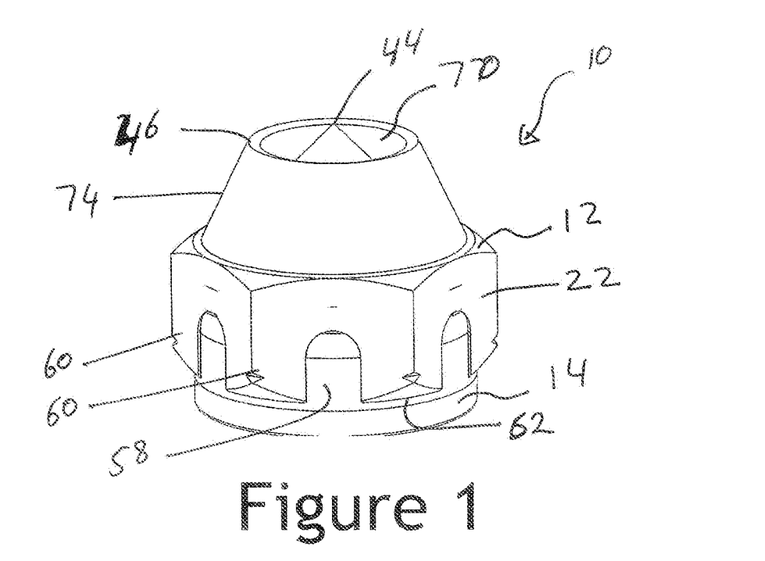
FIG. 1 is perspective view of a security plug according to a first embodiment of the invention.
Figure 2:
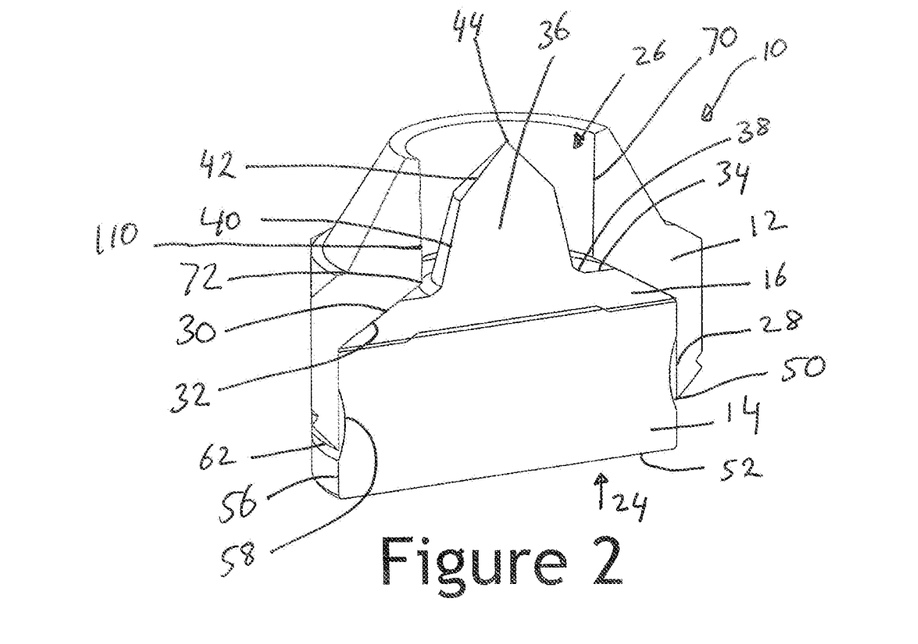
FIG. 2 is a cross sectional perspective view of the security plug of FIG. 1.

The plug 10 is comprised of a shell 12, a magnet 14 and spike member 16. The spike member 16 is optional but provides additional security features. The shell 12 and spike member 16 are preferably nonmagnetic and may be formed of stainless steel, titanium or any other suitable material.

The plug 10 of this embodiment is intended to be inserted into a female hexagonal Allen key socket 18 of bolt 20 and to be a snug fit in the socket 18. Accordingly the shell 12 has a hexagonal peripheral surface 22 corresponding to the hexagonal shape of the socket 18.

The invention is not limited to use on hexagonal Allen key systems and may be used with other fastening systems, such as, but not limited to those having a star shaped recesses, usually of 6 points, with and without centre pins, other polygonal systems, typically having four or five faces, with and without centre pins or any suitable socket shape. Accordingly the external peripheral surface 22 may be modified to match the intended female socket.

The shell 12 has a lower recess 24 which receives the central spike member 16 and magnet 14 and an upper recess 26. In the embodiment shown the lower recess 24 has, in plan view, a cylindrical surface 28 with a constant diameter but surface 28 need not be circular or of constant cross sectional shape.

A frusto-conical surface 30 extends from the surface 28 to upper recess 26.

The central spike member 416 has a corresponding frusto-conical surface 32. If desired surfaces 30 and 32 may be of other shapes. For example, surface 30 may be a planar radially extending surface.

Surface 30 extends radially inwards more than surface 32 but this is not critical. If desired surface 30 may extend radially inwards as much as surface 30 or more.

Central spike member 16 has an annular surface 34 extending radially inwards from surface 32 and central spike 36 extends into upper recess 26 toward open end 34. Central spike 36 has transition surface 38, a first frusto-conical surface 40 and conical surface 42, which ends at point 44. Point 44 is near to the plane of open end 46 so as to prevent insertion of a tool other than a suitable tool into the upper recess 26. The point 44 may be flush with or slightly recessed relative to the open end 46 but preferably does not extend beyond the plane.

If desired the central spike need not have separate surfaces 40 and 42 but have one surface or more than two surfaces. Whilst the surfaces 40 and 42, in cross section, are planar, this is not critical and, if desired, they may comprise a revolution of a curved line. Use of a surface that is not a constant distance from the axis prevents gripping by pliers or the like and the like; application of compressive forces will drive the gripping tool towards the point 44.

The magnet 14 is secured to the shell and/or the central spike member 16 by various mechanical methods, such as by one or more of gluing or crimping or other suitable methods.

In the embodiment shown the magnet 14 extends downwards beyond the lower edge 50 of the shell. This is not critical and the base 52 of the magnet may be flush with the lower edge 50.

Depending on the shape of the base 54 of the female socket the base 52 of the magnet may have a non planar surface. Some fasteners include a central pin that extends from the base 52 toward the open end 18 and, accordingly, the magnet may have a central recess or aperture. If necessary the central spike member 16 may also have a recess or aperture to receive such a pin. Where such a recess or aperture is provided it need not be a snug fit with the central pin.

The side wall 56 of the magnet 14 may be provided with a circumferential recess 58 to allow for adhesive between the magnet and shell 12 and/or for crimping of the shell 12 to the magnet 14. This recess 30 is not critical and may be omitted. If desired a series of axially extending slots or groves may be provided in either one or both of the magnet and shell for receiving adhesive.

Figure 21:
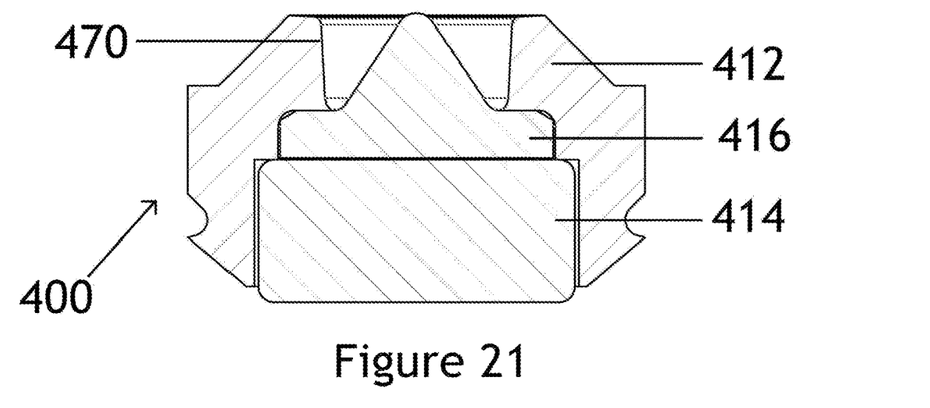
FIG. 21 is perspective view of a security plug according to another embodiment of the invention.
Figure 22:
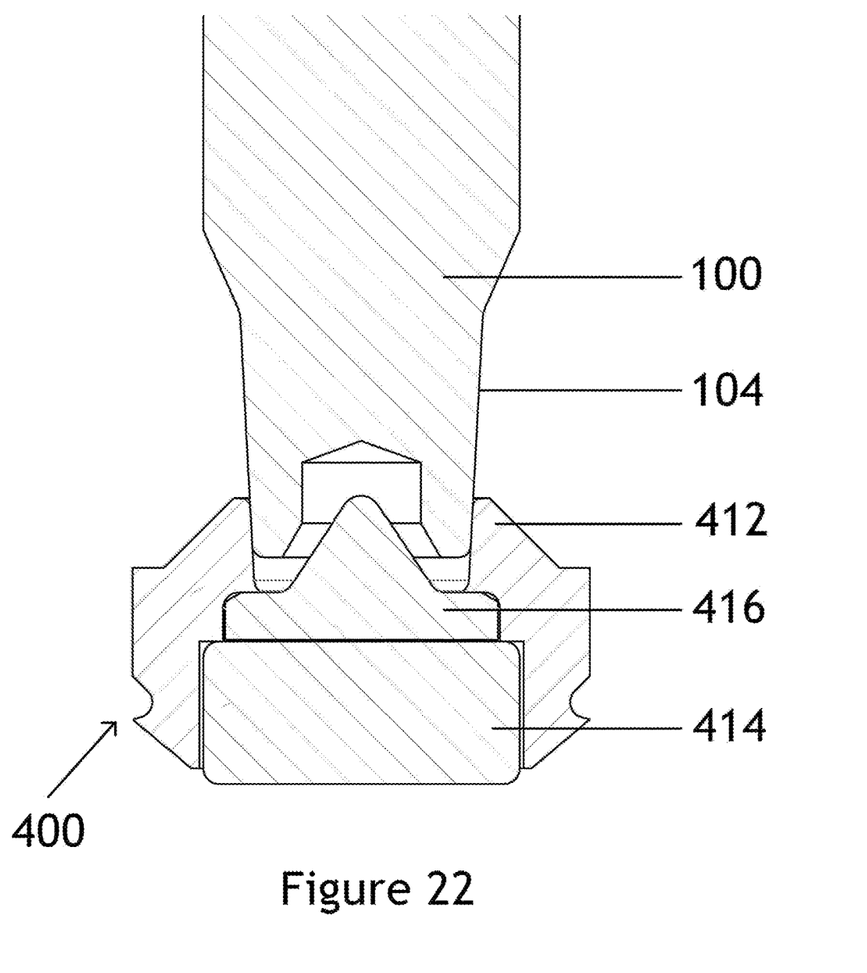
FIG. 22 is cross sectional view of the security plug of FIG. 21.

In the embodiment shown the shell 12 has a series of legs 60 whose ends 62 overlie the recess 58 and are spaced from the recess, so allowing for crimping. The bending of the legs 60 is insignificant to the fit of the shell in the female socket 18. The legs 60 are not essential and the shell may be formed with a continuous surface, as seen in FIGS. 21 and 22. This is achieved by using a magnet having a smaller diameter relative to the shell.

The upper recess 26 has a frusto-conical inner surface 70 that is a tapered inwards and downwards toward magnet 14. This surface 70 is preferably a Morse taper or similar to Morse taper but other tapers may be used. A Morse taper is preferred as complementary male and female members with a Morse taper can be self-holding.

The lower end 72 of the surface 70 has a larger diameter than the lower end of surface 40 and/or transition wall 38 and so a gap exists between lower end 52 and spike 36.

A conical wall surface 74 extends upwards and inwards from above the hexagonal outer surface 22.

Figure 3:
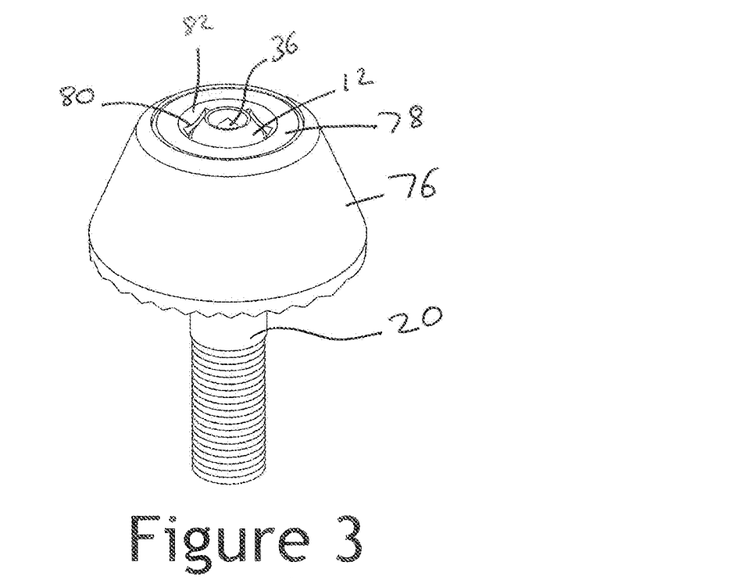
FIG. 3 is a perspective view of the security plug of FIG. 1 installed in a bolt with a female Allen key socket.

In use the security plug 10 is merely inserted into the female socket 18 of the bolt, after the bolt has been installed and tightened. For existing installations there is no need to remove or loosen the bolt. In FIG. 3 onwards the bolt 20 is shown located in an additional security sleeve 76 that prevents gripping of the external surface of the bolt 20. The sleeve 76 is not part of the present invention.

Figure 4:
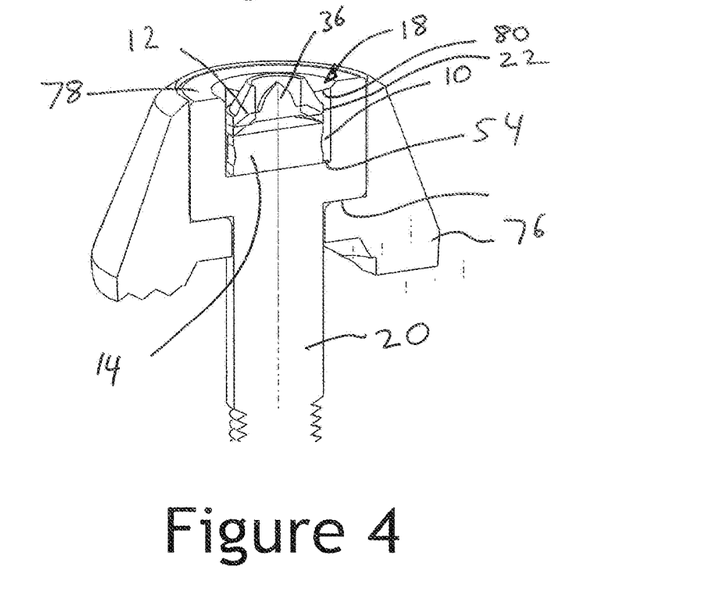
FIG. 4 is a cross sectional perspective view of the security plug and bolt of FIG. 3.

The overall height of the plug 10 is such that when fully inserted into socket 18 the plug extends at least to the end 80 of the female hexagonal socket and more preferably toward the free end 78 of the bolt. Most bolts with female sockets tend to have a conical wall surface 82 surrounding the female socket to aid centering of the relevant tool into the female socket.

Figure 6:
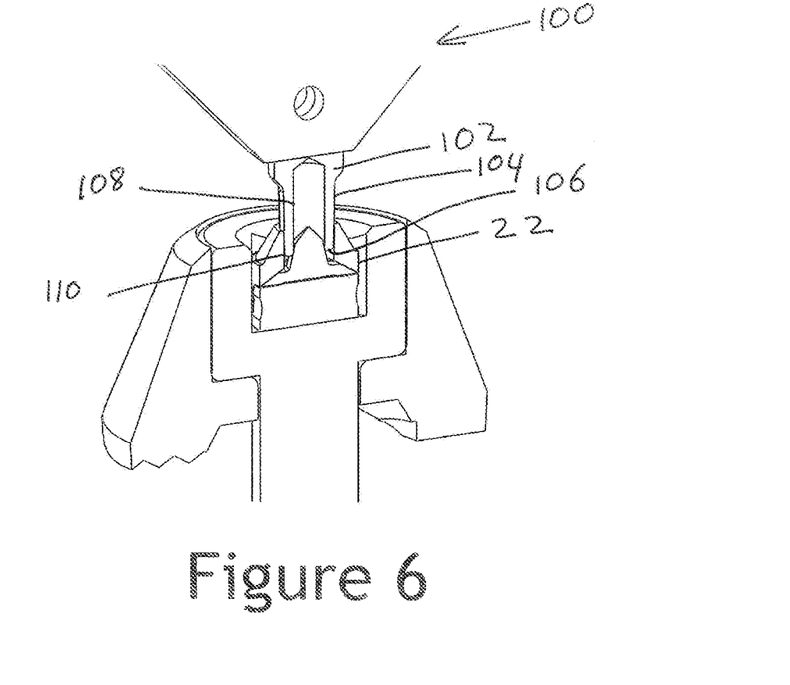
FIG. 6 is a perspective view of the security plug of FIG. 1 installed in a bolt with a female Allen key socket with a removal tool engaged with the plug.

As seen in FIGS. 4 and 6 the hexagonal outer surface 22 does not extend the full height of the female socket 18. This is to accommodate bolts with different depth female sockets as it is preferred that, when installed, the hexagonal outer surface 22 is located within the female socket and does not extend out of the female socket at all or only insignificantly. If a significant portion of the hexagonal outer surface 22 extended out of the female socket 18 this would provide a non circular surface that could be gripped to turn the bolt 20.

The outer conical surface 74 blocks access to the exposed portions of the female socket 18 and prevents engagement by a hexagonal tool.

When inserted into the female socket 18 the magnet 14 holds the plug 10 in the bolt 20 through magnetic attraction with the bolt 20. As such the plug will not fall out of the socket 18 during normal use and, because it does not present any easily gripped surfaces, cannot be easily pulled out of the socket without an appropriate tool.

Once inserted into the female socket the plug is then held securely within the socket.

Figure 5:
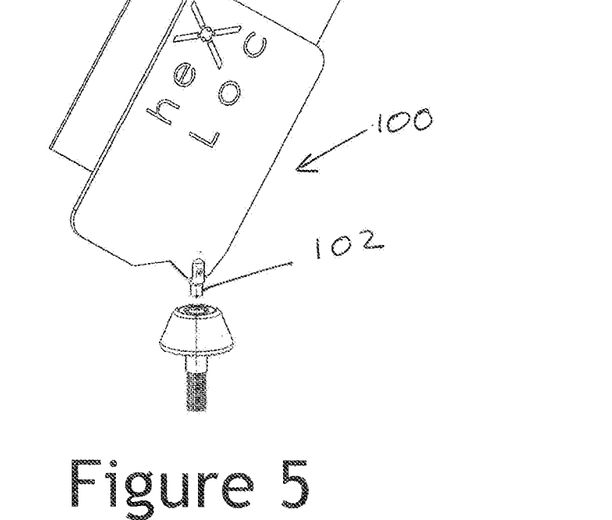
FIG. 5 is a perspective view of the security plug of FIG. 1 installed in a bolt with a female Allen key socket and a removal tool.

To remove the plug a complementary tool 100 is required. The tool has a tubular member 102 with a conical outer surface 104 tapered to a smaller diameter at free end 106. The outer surface 104 has the same taper as surface 70. The inner surface 108 of the tubular member 102 merely needs to have a large enough size to allow insertion of the tubular member 102 into the upper recess 26 and engagement by outer surface 104 with the surface 70 before it engages the surfaces of central spike 36. The inner surface 108 may be a cylindrical bore.

In use the tubular member 102 is inserted into the recess 26. The outer diameter of the free end 106 is the same as the diameter of surface 70 at a location 110 between its inner and outer ends. Thus the tubular member 102 may be inserted until free end 106 reaches location 110. At this position the surfaces 70 and 104, because they have the same taper, engage over their entire overlapping regions. A small downwards pressure forces the surfaces 70 and 104 into intimate contact. As with such taper connections the male surface 104 expands the female surface 70 very slightly and the resulting compressive forces applied by the female surface 70 to the male surface 104 hold the two components together.

The amount of overlap of the surfaces 70 and 104 is chosen to provide sufficient "grip" to overcome the magnet 14 and any striction/friction between the hexagonal wall surfaces 22 and socket 18.

The user may then apply an outwards pull on the tubular member 100 to withdraw the plug 10 from the socket 18. The socket 18 is then free to be accessed by a suitable tool.

The plug thus allows for the bolt to be directly loosened or tightened by its complementary tool without comprise by the plug.

As mentioned, the inner diameter 108 is sized so that there is clearance between it and the central spike 36 and so there is no interaction with the central spike.

A Morse taper has a taper that is approximately ⅝ inch per foot, approximately one in twenty. Different "standard" Morse tapers have slight variations on this taper. As mentioned, the taper used is a Morse taper or like a Morse taper but need not be a standard Morse taper. The reason is that plugs according to the invention will be made with different taper angles and different diameters for location 110, so as to provide more than one combination of plug 10 and tool 100.

The tubular portion 102 of a tool 100 will only engage in a recess 26 with the same taper and will not engage securely (if at all) in a socket with a different taper. Providing a range of tapers means that any one tool is less likely to fit a random socket.

Similarly, providing different diameters also prevents tools with the same taper being used in different size sockets. A first tool which has the same taper angle as a second tool designed for a use with a recess 26 but a free end 106 with a diameter larger than the second tool will engage the surface 70 nearer to the open end than the second tool. Accordingly, the amount of overlap and consequential gripping between plug 10 and tool will be less. Below a certain threshold, that gripping function will not allow the plug 10 to be removed. A tool with the same taper angle but a smaller diameter free end 106 may be inserted further into the recess 26 but the annular surface and/or spike surfaces will limit inwards movement and prevent the tapered surfaces engaging whatsoever. Choosing a location 110 near to the inner end of the surface 70 limits the scope to use tools with a smaller diameter free end 106.

FIGS. 7 to 13 show a security plug 200 according to a second embodiment of the invention. The plug 200 comprises a shell 202 with a similar outer shape to plug 10 of the first embodiment. The plug has hexagonal side surface 204 and conical upper surface 206. A central conical spike 208 extends upwards in recess 210. The shell 202 includes two bores 212 in which are located two bar magnets 214 and 216. The bar magnets extend out of the base 218 of shell 202 and are preferably shaped so that their upper ends 220 and 222 are flush with the surface formed by the recess 210 and central spike 208.

Figure 7:
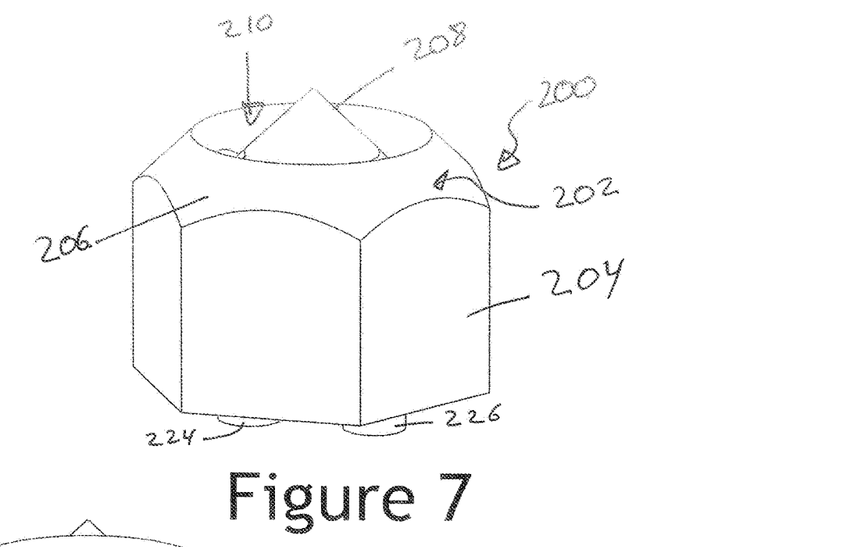
FIG. 7 is perspective view from above of a security plug according to a second embodiment of the invention.
Figures 8, 9:
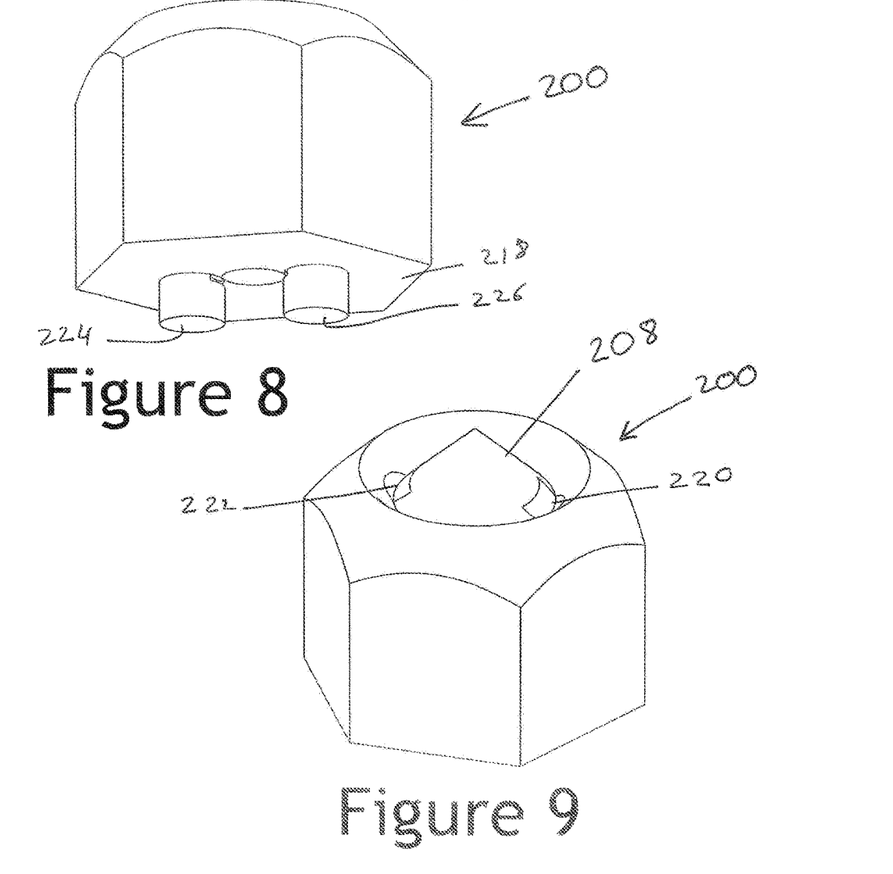
FIG. 8 is perspective view from below of the security plug of FIG. 7.
FIG. 9 is a different perspective view from above of the security plug of FIG. 7.

The two bar magnets 214 and 216 are arranged so that adjacent ends have opposite Poles. Thus, lower end 224 of magnet 216 may be a South Pole with lower end 226 of magnet 214 will be a North Pole, whilst ends 222 and 220 will be North and South Poles.

Figure 10:
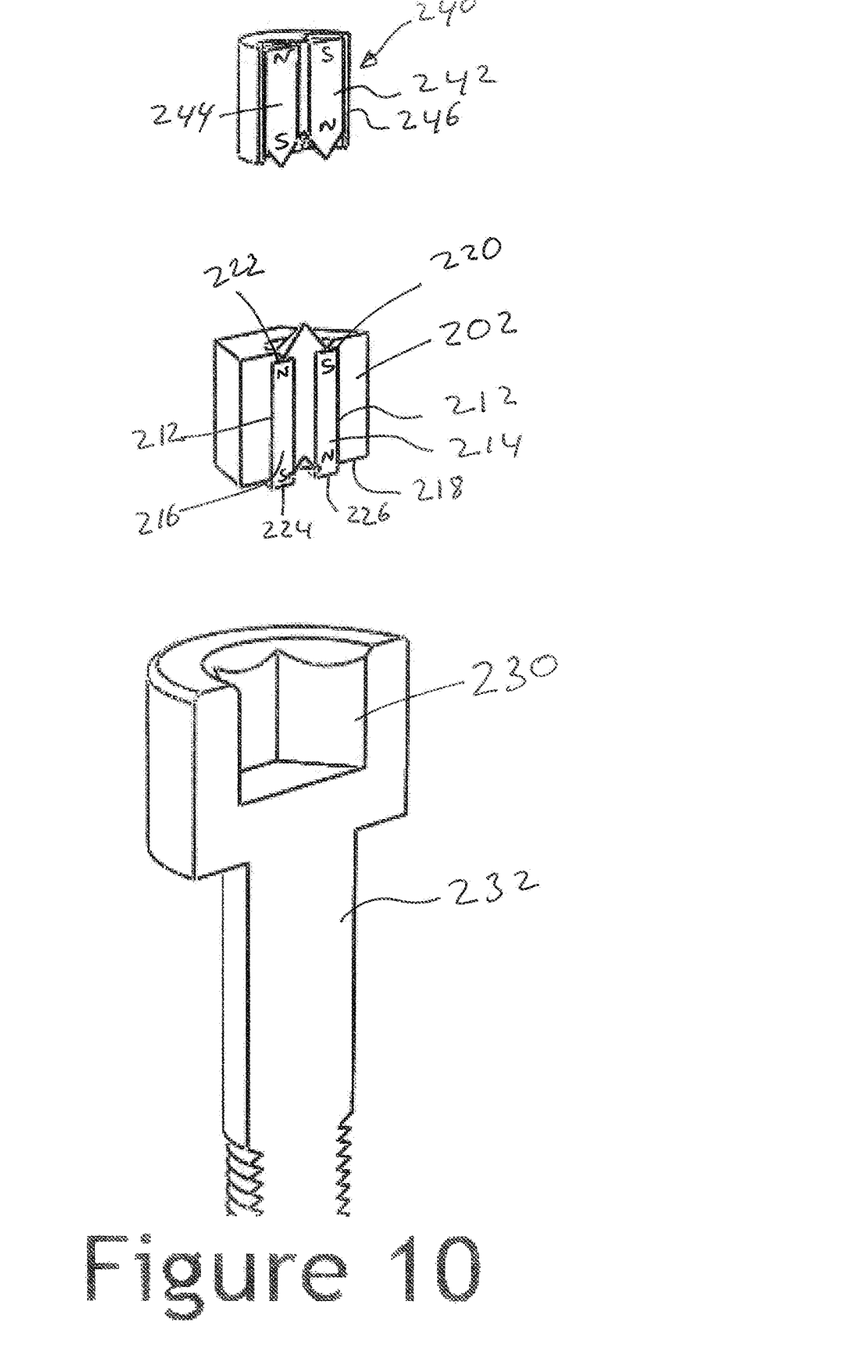
FIG. 10 is an exploded perspective cross sectional view of the security plug of FIG. 7, a bolt with which it is used and a removal tool.
Figure 11:
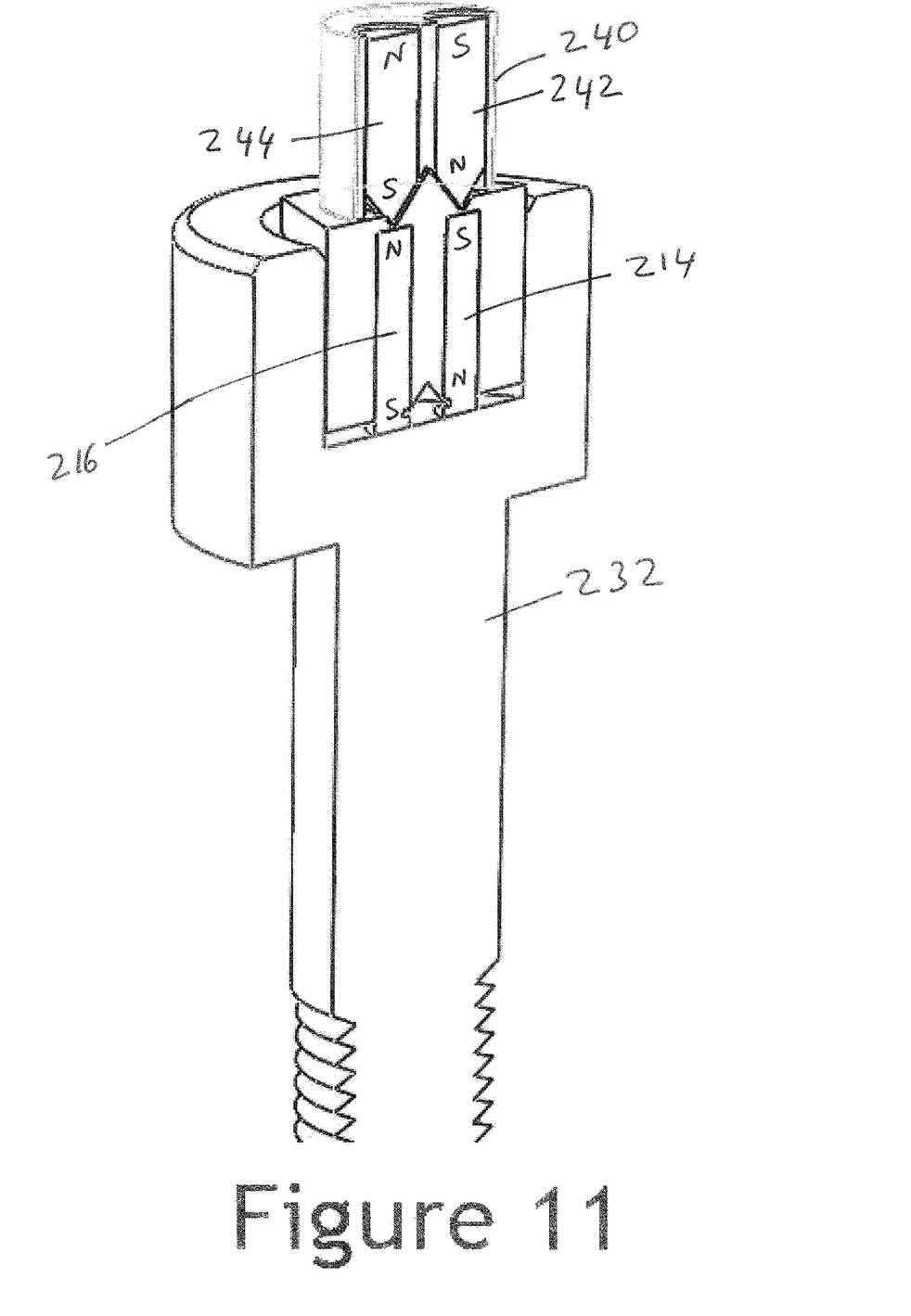
FIG. 11 is an perspective cross sectional view of the security plug of FIG. 7, in the bolt with which it is used and a removal tool.

Plug is sized to fit into socket 230 of bolt 232 and be retained within the socket by the magnetic attraction of the two magnets 214 and 216.

Figure 12:
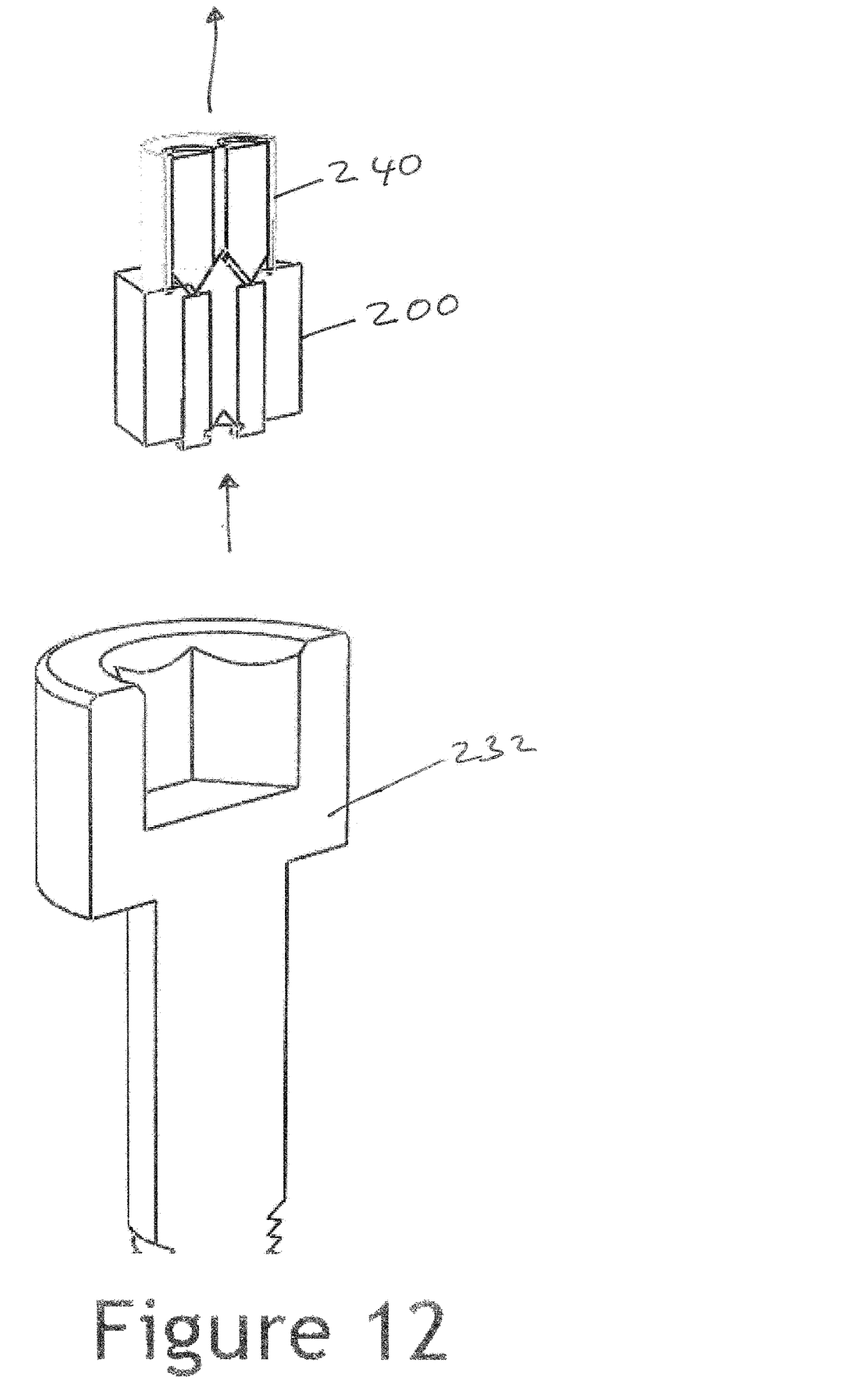
FIG. 12 is an perspective cross sectional view of the security plug of FIG. 7 connected to its removal tool after removal from the bolt with which it is used.

Removal of the plug requires a tool 240 that includes two bar magnets 242 and 244 with opposite poles at their lower end located in support member 246. The lower end of tool 240 is complementary to the upper end of plug 200 so that it may be placed on the plug with the magnets 242 and 244 aligned with the magnets 214 and 216 in plug 200. The attraction between the four magnets is greater than the attraction between magnets 214 and 216 and the bolt 232 and so the user may withdraw the plug from the socket 230 merely by pulling the tool 240 away from bolt 232, as shown in FIG. 12.

Use of magnets with opposite polarity prevents removal by a single magnet.

Figure 13:
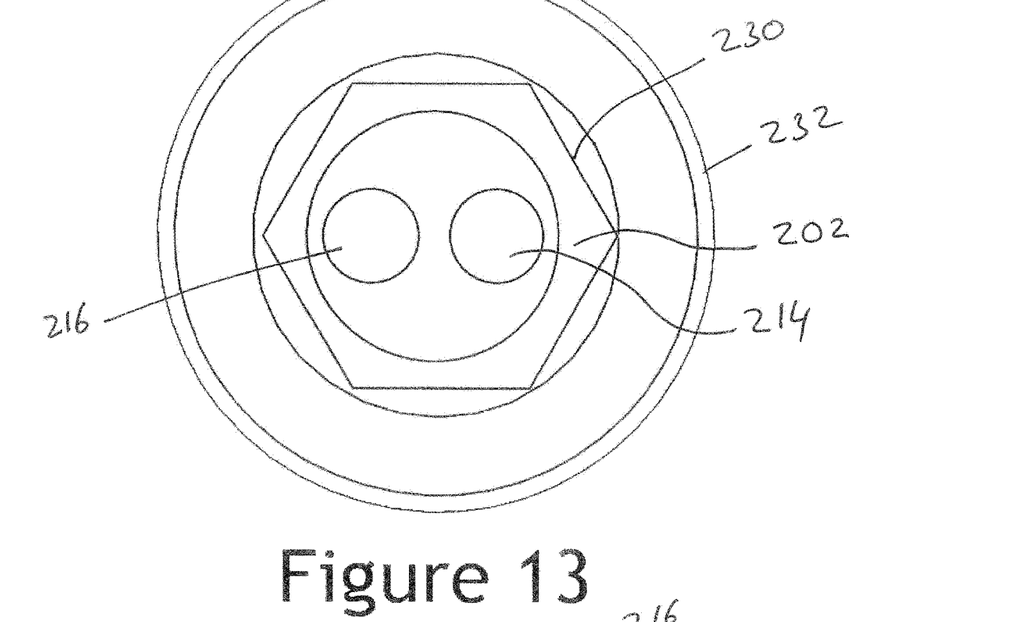
FIG. 13 is a plan view from above of the security plug of FIG. 7 in the bolt with which it is used.
Figure 14:
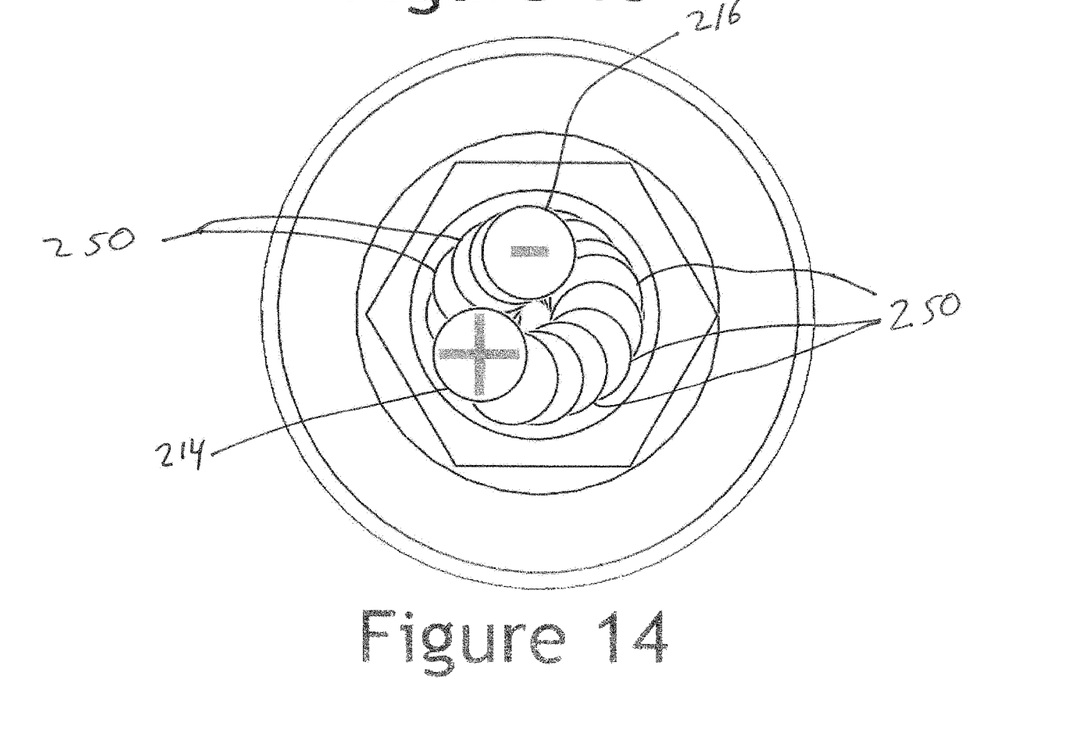
FIG. 14 is a plan view from above of the security plug of FIG. 7 in the bolt with which it is used showing potential alternative relative locations of retaining members.

FIG. 13 shows a plan view of the plug 200 in the bolt 232 and with magnets 214 and 216 arranged diametrically opposite to each other. However, as indicated in FIG. 14, the two magnets need not be located diametrically opposite to each other and may be located at random positions, as indicated by part circles 250. Whilst circles 250 are shown lying on the same radius, the two magnets need not be located at the same radial distance from the centreline.

Providing the magnets at locations other than diametrically opposite to each other provides for a significant number of combinations and requires a matching removal tool 240.

Whilst the embodiment shown has two magnets three or more magnets may be used, which further increases the number of possible combinations.

FIGS. 15 to 20 show a security plug 300 according to a third embodiment of the invention.

Figures 15, 17:
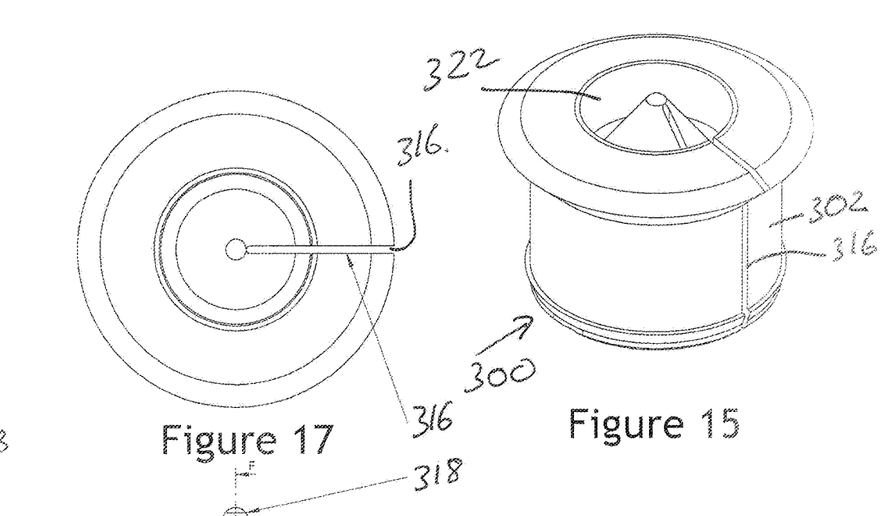
FIG. 15 is perspective view of a security plug according to a third embodiment of the invention.
FIG. 17 is a plan view from above of the security plug of FIG. 15.

The security plug 300 comprises a shell 302 with a plug portion 304 with a circular outer surface 306 and a cap portion 308 that extends radially more than the base portion 304.

Figure 19:
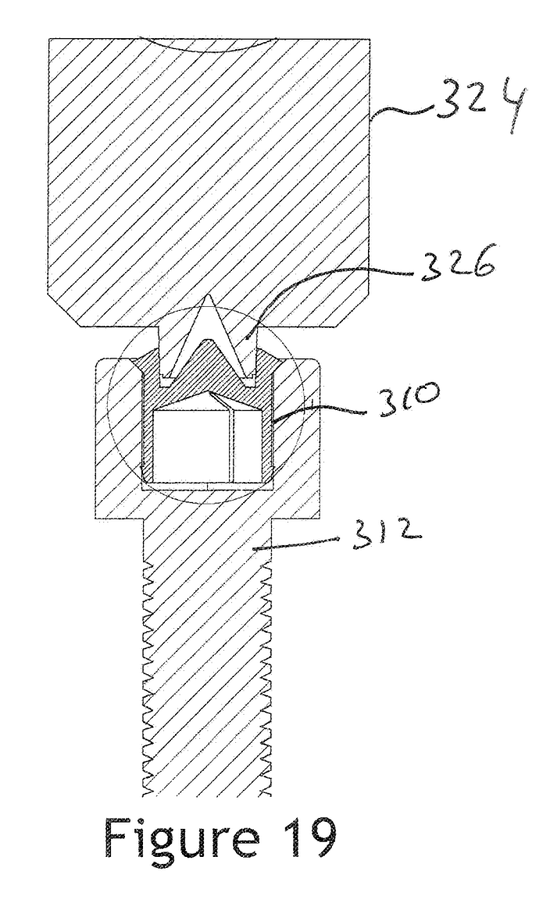
FIG. 19 is a side cross sectional view of the security plug of FIG. 15 installed in a bolt and engaged with a removal tool.
Figure 20:
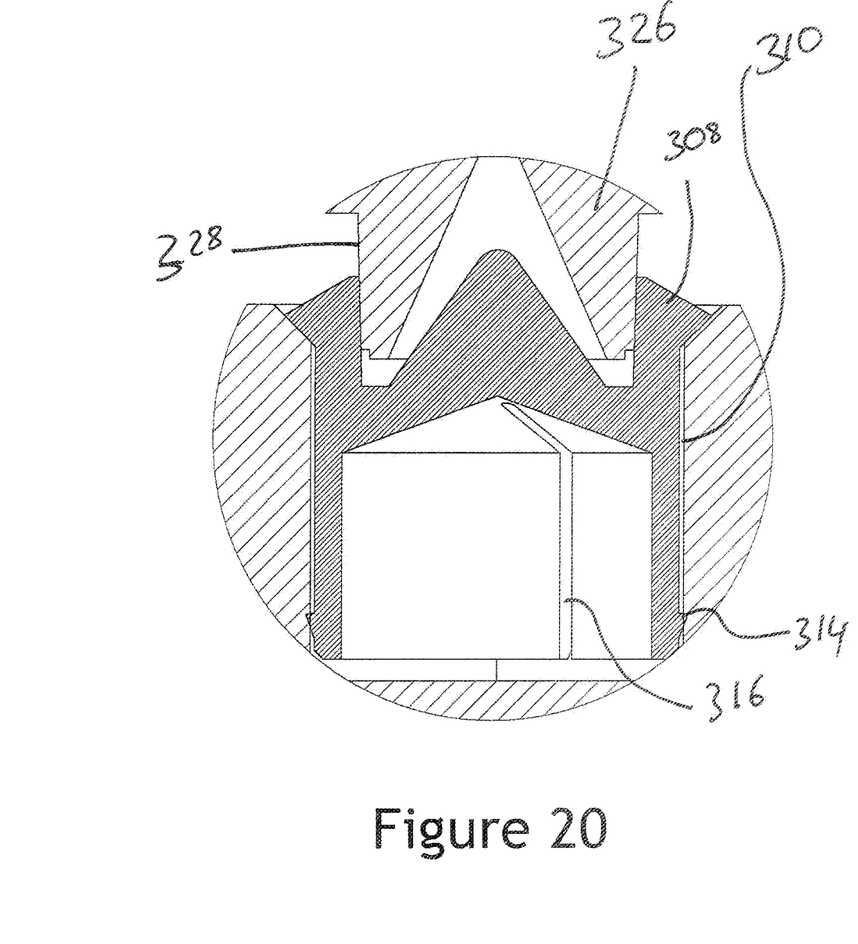
FIG. 20 is a detail view of part of FIG. 19.

The diameter of plug portion 304 is sized to fit within socket 310 of bolt 312. Cap portion 308 limits the depth of insertion of plug into socket 310.

Plug portion 304 includes at least one protrusion 314. Whilst protrusion 314 is shown in the drawing as a simple circle it may be part of a screw thread.

Protrusion 314 need not be a single continuous protrusion and there may be a series of protrusions, lying on one or more circular or spiral paths. Protrusion 314 is an interference fit with the socket and so bites into the surface of the socket and holds the plug in the socket.

The plug 300 may include a slot 316 that allows the plug to contract slightly as it is inserted into socket and so provide outward directed force to the protrusion(s).

Figure 16:
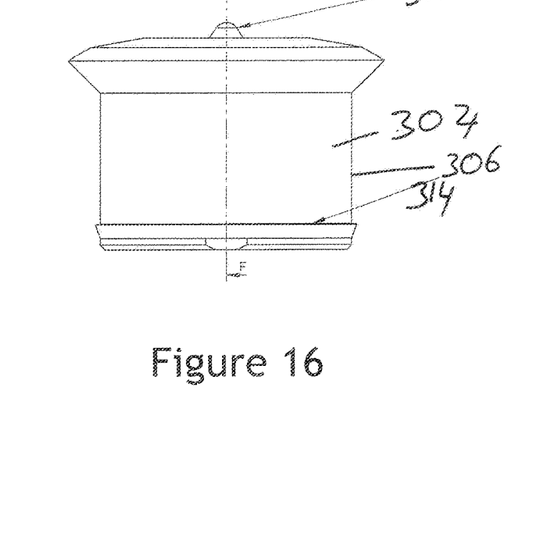
FIG. 16 is a side view of the security plug of FIG. 15.
Figure 18:
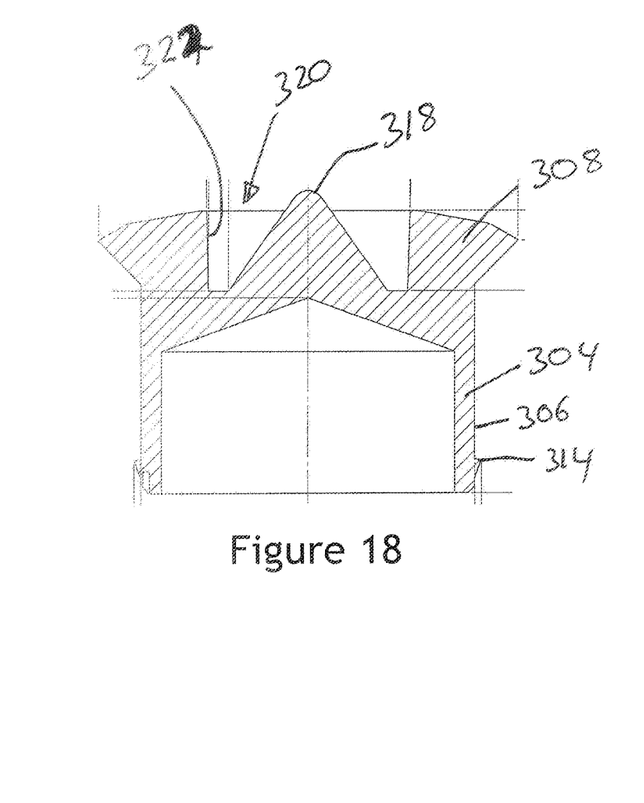
FIG. 18 is a side cross sectional view of the security plug of FIG. 15.

Plug 300 includes upper recess 320 and central protrusion 318 that, as best seen in FIGS. 16 and 18 extends above the top of cap portion 308. The plug may be driven into the socket by hammering or otherwise impacting on central protrusion 318.

The surface 322 of recess 320 has a Morse taper or Morse like taper, in a similar manner to the first embodiment. A tool 342 with a tubular portion 326 having an outer surface 328 with a Morse taper or Morse like taper complementary to surface 322.

On insertion of the tool into plug 300 the user may use the tool to withdraw the plug 300 from the socket. Where the protrusion(s) 314 define at least one screw thread this may require rotary motion to be applied to the plug, either alone or in combination with an axial pulling motion. Otherwise, a simple pulling motion may suffice. The variations of the tapered surface described in relation to the first embodiment are equally applicable to this embodiment.

FIGS. 21 and 22 show a security plug 400 according to another embodiment of the invention. The plug is substantially similar to the plug 10 of the first embodiment and functions in substantially the same manner.

The plug 400 is comprised of a shell 412, a magnet 414 and spike member 416. The shell 412 has recess 470 with a Morse taper that engages with outer surface 104 of tool 100 that has a complementary Morse taper.

The plug 400 differs from plug 10 in that the magnet 414 and spike member 416 each have proportionally smaller diameter compared to the shell 412. Accordingly the shell 412 has a continuous hexagonal peripheral surface 422 and lower recess 424 may be a cylindrical bore. In this embodiment the magnet does not have a circumferential recess corresponding to recess 58 of the plug 10. Instead the magnet 414 and spike member 416 are retained using other methods. The magnet 414 and optionally the spike member 416 may be an interference fit in the recess 424. Alternatively or in addition the magnet and optionally the spike member 416 may be retained using glue or adhesive. It will be appreciated that if the magnet 414 is securely retained in the recess 424 the spike member 416 is also retained.

Unless the context clearly requires otherwise, throughout the description and any claims the words "comprise", "comprising", and the like are to be construed in an inclusive sense as opposed to an exclusive or exhaustive sense; that is to say, in the sense of "including, but not limited to".

The features of the invention described or mentioned in this document may be combined in any combination of features where features are not mutually exclusive.

It will be apparent to those skilled in the art that many obvious modifications and variations may be made to the embodiments described herein without departing from the spirit or scope of the invention.

The invention claimed is:

1. A security plug for a fastener having a longitudinally extending female socket adapted to receive a first tool, the plug adapted to be inserted into the female socket to prevent the first tool engaging in the female socket, the plug comprising:
   an outer surface portion complementary to the female socket;
   at least one retaining member for retaining the plug in the female socket, and
   at least one removal portion comprising at least one first engagement surface adapted to be engaged by a second tool having at least one second engagement surface complementary to the at least one first engagement surface, whereby mechanical engagement of the at least one first and second engagement surfaces provides engagement between the second tool and the plug to allow force applied longitudinally by the second tool on the plug to withdraw the plug from the female socket against the action of the at least one retaining member,
   wherein at least one first engagement surface has a Morse taper or another self-holding taper.

2. A security plug of claim 1 wherein engagement of the plug by the second tool consists of movement together in the longitudinal direction.

3. A security plug of claim 1 comprising at least one longitudinally extending first recess.

4. A security plug of claim 3 wherein the at least one longitudinally extending first recess comprises said at least one first engagement surface.

5. A security plug of claim 3 comprising at least one first protrusion extending longitudinally within at least one first recess.

6. A security plug of claim 1 comprising at least one longitudinally extending first protrusion.

7. A security plug of claim 6 wherein the at least one longitudinally extending first protrusion comprises said at least one first engagement surface.

8. A security plug of claim 1 wherein the plug has first and second longitudinal ends and the at least one removal portion is located at or adjacent the first longitudinal end and the at least one retaining member is located at or adjacent the second longitudinal end, the plug adapted to be inserted into the female socket with the at least one retaining member engaging an inner end of the female socket.

9. A security plug of claim 1 wherein the at least one retaining member comprises at least one magnet adapted for engagement with a fastener having at least one magnetic portion.

10. A security plug of claim 1 comprising a second recess and at least one retaining member located in the second recess.

11. A security plug of claim 10 wherein the plug comprises at least one longitudinally extending first recess and the second recess has a second opening in an inner end that communicates with the first recess.

12. A security plug of claim 11 comprising a spacer located in the second recess sandwiched between the inner end and the at least one retaining member.

13. A security plug of claim 12 wherein the spacer includes a protrusion that extends through the opening into the first recess.

14. A security plug of claim 12 wherein the spacer is non-magnetic.

15. A security plug of claim 11 wherein at least part of at least one retaining member extends through the opening into the first recess.

16. The combination of a security plug of claim 1 and the second tool complementary to the plug.

17. The combination of claim 16 wherein the plug has
a first longitudinally extending recess having a frusto-conical first engagement surface;
first protrusion extending longitudinally within said first recess, and
a magnetic retaining member for retaining the plug in the female socket, and
the second tool comprises a hollow tube having an outer surface comprising said second engagement surface at a first end, the first end sized to receive at least a part of the protrusion when the first and second engagement surfaces are engaged.

18. A security plug of claim 1 wherein one of the first and second engagement surfaces comprises a female engagement surface and the other of the first and second engagement surfaces comprises a male engagement surface adapated to be received within the female engagement surface and wherein, when the first and second engagement surfaces are engegaed together, the male engagement surface expands the female engagement surface very slightly and the resulting compressive forces applied by the female engagement surface to the male engagement surface over the overlapping regions of male and female surfaces hold the security plug and the second tool together.

19. A security plug of claim 1 wherein the self-holding taper has a slope relative to its centreline between about one in twenty (1:20) and about five in ninety six (5:96).

20. A security plug of claim 1 wherein the another self-holding taper has a slope relative to its centreline of about one in twenty (1:20).

21. A security plug of claim 1 wherein the another self-holding taper has a slope relative to its centreline of about five in ninety six (5:96).

22. A security plug for a fastener having a female socket adapted to receive a first tool, the plug adapted to be inserted into the female socket to prevent the first tool engaging in the female socket, the plug comprising:
a first outer surface portion complementary to the female socket;
a first longitudinally extending recess having a frusto-conical first engagement surface;
a first protrusion extending longitudinally within said first recess;
a magnetic retaining member for retaining the plug in the female socket,
wherein
the first engagement surface is adapted to be engaged by a second tool having a second surface complementary to the first engagement surface, whereby engagement of the first and second engagement surfaces provides engagement between the second tool and the plug to allow force applied longitudinally by the second tool on the plug to withdraw the plug from the female socket against the action of the retaining member, and
wherein said first engagement surface has a Morse taper or another self-holding taper.

23. A security plug of claim 22 wherein the first recess has an open end at a first longitudinal end of the plug and the magnetic retaining member is located at the other longitudinal end of the plug.

24. A security plug of claim 23 including a spacer wherein the magnetic retaining member is located between the spacer and the other longitudinal end and the spacer comprises the first protrusion.

25. The combination of a security plug of claim 23 and a fastener having a longitudinally extending female socket adapted to receive a first tool, the plug adapted, in use, to be inserted into the female socket with the other longitudinal end entering the female socket first, wherein the female socket has a substantially constant cross section along its length and has an inner end that is magnetic with which the magnetic retainer engages to retain the security plug in the female socket.

26. A security plug of claim 22 wherein the first engagement surface comprises a female engagement surface and the second engagement surface comprises a male engagement surface and wherein, when the first and second engagement surfaces are engegaed together, the male engagement surface expands the female engagement surface very slightly and the resulting compressive forces applied by the female engagement surface to the male engagement surface over the overlapping regions of male and female surfaces hold the security plug and the second tool together.

27. A security plug of claim 22 wherein the self-holding taper has a slope relative to its centreline between about one in twenty (1:20) and about five in ninety six (5:96).

28. A security plug of claim 22 wherein the another self-holding taper has a slope relative to its centreline of about one in twenty (1:20).

29. A security plug of claim 22 wherein the another self-holding taper has a slope relative to its centreline of about five in ninety six (5:96).

* * * * *